Sept. 25, 1951     M. K. BENSON     2,569,144
OVERLOAD RELEASE FRICTION COUPLING
Filed Nov. 21, 1946
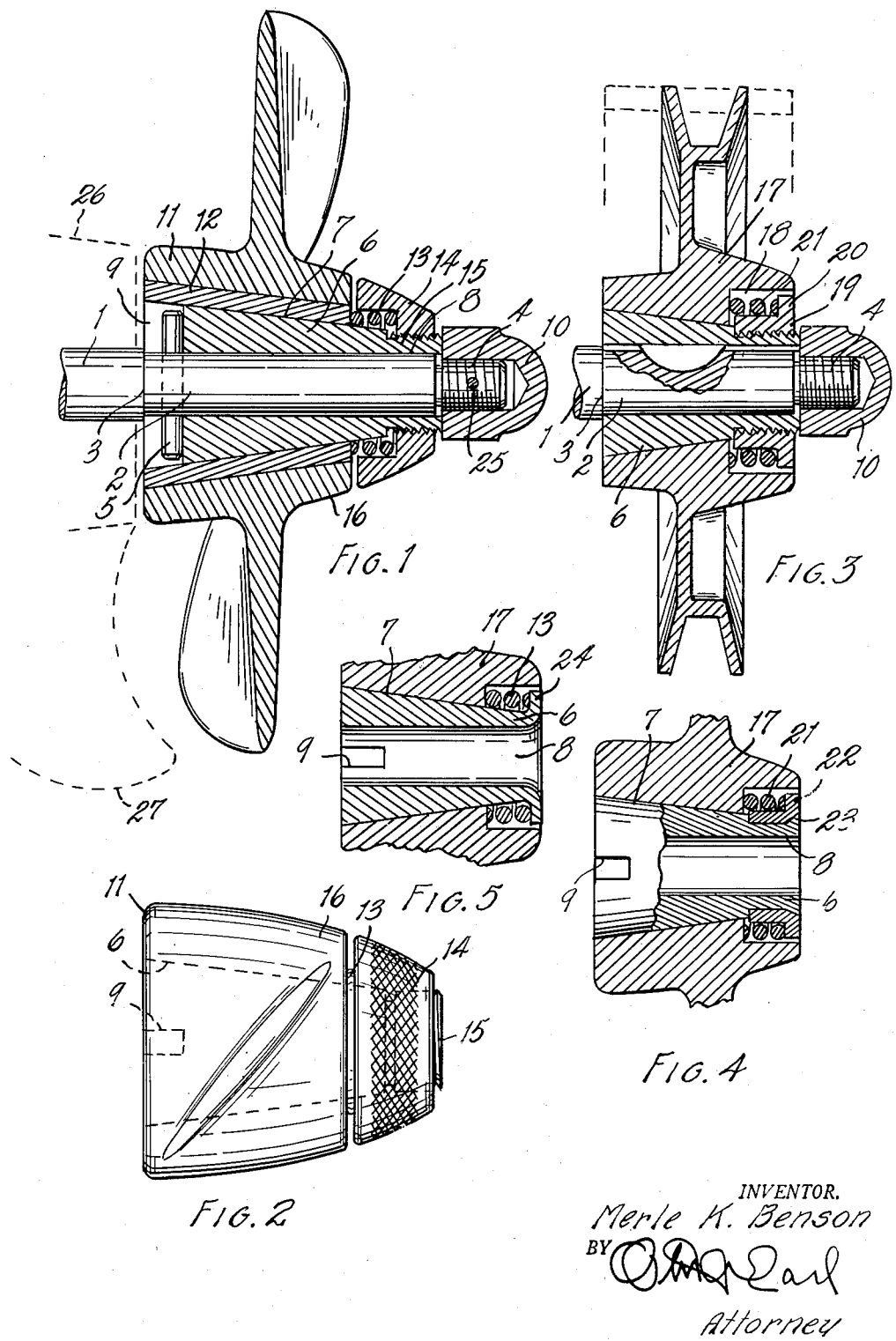
INVENTOR.
Merle K. Benson
BY
Attorney Patented Sept. 25, 1951

2,569,144

UNITED STATES PATENT OFFICE 2,569,144

OVERLOAD RELEASE FRICTION COUPLING

Merle K. Benson, Benton Harbor, Mich., assignor to T-M-K Corporation, Davenport, Iowa, a corporation of Iowa Application November 21, 1946, Serial No. 711,300

6 Claims. (Cl. 64—30)

1

This invention relates to improvements in friction driven propellers, pulleys, gears and the like.

The main objects of this invention are:

First, to provide a propeller in which the propeller proper is friction driven so that injury to the blades does not result when the propeller engages an obstruction such as a log or stump or the like.

Second, to provide a friction drive for propellers, pulleys and gears in which the parts may be assembled as a unit to be removably mounted on a driving shaft.

Third, to provide a friction drive including a spring for frictionally urging the clutch elements together, in which the spring is effectively housed and protected and at the same time located for efficient action.

Fourth, to provide a structure embodying the aforestated advantages, which may be very economically produced and one in which the parts are arranged to minimize the stress thereon incidental to use.

Further objects relating to details and economies of the invention will appear from the description to follow. The invention is defined in the claims.

A structure which embodies the features of the invention is illustrated in the accompanying drawing, in which:

Fig. 1 is a longitudinal center section of a propeller embodying my invention, the shaft being shown in full lines, portions of the support and rudder being indicated by dotted lines.

Fig. 2 is an elevational view of the propeller of the embodiment of Fig. 1 removed from the shaft.

Fig. 3 is a fragmentary view partially in longitudinal section of a slightly modified form or embodiment of my invention and illustrating an adaptation thereof to a pulley.

Fig. 4 is a fragmentary view mainly in longitudinal section of a further modification of my invention, the shaft being omitted.

Fig. 5 is a fragmentary view in longitudinal section of another modification or embodiment of my invention.

In the embodiment of my invention illustrated in Figs. 1 and 2, the driving shaft 1 is provided with a reduced end portion 2 resulting in a rearwardly facing shoulder 3.

The rear end of the shaft is threaded as indicated at 4. The shaft is provided with a clutch member driving pin 5 adjacent the shoulder 3. The driving clutch member 6 has a conical peripheral surface 7 and bore 8 removably fitting

2 the shaft. The inner end of the driving clutch member desirably abuts the shoulder 3 and it is provided with a transverse slot 9 receiving the pin 5 to provide driving engagement with the shaft. The cap nut 10 is threaded into the end of the shaft to clamp the driving clutch member against the shoulder 3 of the shaft and the parts are preferably proportioned so that the nut also clamps the driving clutch member against the pin 5. Where the shaft is not provided with a shoulder the end thrust is entirely sustained by the pin.

The hub 11 is internally tapered to receive the bushing 12 which constitutes a friction driven element for the propeller. This bushing is desirably a driving fit within the hub of the propeller so that it constitutes a fixed part thereof. The driving clutch member 6 projects from the rear end of the propeller hub to receive the spring 13, the inner end of which engages the bushing of the hub, the outer end being engaged by the abutment 14 which is threaded upon the threaded end 15 of the driving clutch member. This abutment member 14 is chambered to provide a housing covering and protecting the spring. The abutment member 14 is desirably contoured to complement the external surface 16 of the hub or propeller. The abutment member is desirably knurled as indicated to facilitate grasping. However, it is not commonly necessary to adjust the tension of the spring after it has been properly adjusted. One of the main advantages of the adjustable abutment is that it avoids the necessity for great care in manufacture; that is, it allows for a wider range of tolerances than would otherwise be permitted.

In Fig. 3 I illustrate an embodiment of my invention in a pulley or gear, a V-belt pulley being shown by full lines and a gear being conventionally included by dotted lines. In this embodiment the hub 17 engages directly with the driving member 6; that is, the bushing 12 is omitted. In this construction the hub is provided with a rearwardly opening chamber or recess 18 adapted to receive the abutment member 19 which has the outwardly projecting flange 20 supporting the spring 21 corresponding to the spring described. In this construction the spring surrounds the abutment member which is threaded upon the rear end of the driving clutch member.

The embodiment shown in Fig. 4 is the same as that shown in Fig. 3 with the exception that the abutment member 22 corresponding to the abutment member 20 is retained by upsetting the ends of the driving shaft member as shown at 23.

In the embodiment shown in Fig. 5 the spring 13 directly embraces the driving clutch member and is supported by the flange-like abutment 24 formed on the rear end of the driving clutch member, after the parts have been assembled.

In the embodiments of Figs. 4 and 5 the hub and the driving clutch member are permanently retained in assembled relation. In the embodiments shown in Figs. 1, 2 and 3 the hub may be disassembled from the driving clutch member, but it is contemplated that in ordinary usage the driven element and the driving clutch member shall be assembled as a unit and handled as a unit, whenever it is desired to dismount from the driving shaft or propeller shaft.

With this arrangement of parts a very effective frictional drive is provided and at the same time one which permits slippage in the event the propeller strikes some object, thereby preventing or minimizing injury to the propeller blades, and the likelihood of bending or distorting the propeller shaft.

The nut 10 is preferably provided with a locking pin 25 so that the nut will not loosen and permit the propeller assembly to fall off the shaft.

I have conventionally illustrated a supporting portion for the propeller shaft at 26 and the rudder at 27.

Where the driven element is a pulley or gear the parts driven thereby are protected. While I refer to driving and driven members or elements it will be understood that power might be applied through the pulley or gear.

I have illustrated and described my invention in highly practical embodiments thereof. I have not attempted to illustrate or describe other adaptations which I contemplate, as it is believed that this disclosure will enable those skilled in the art to embody or adapt my invention as may be desired.

Having thus described my invention, what I claim as new and desire to secure by Letters Patent is:

1. In a propeller the combination of a shaft threaded at its rear end and having a rearwardly facing shoulder and a transverse driving pin adjacent the shoulder, a conical rearwardly tapering driving clutch member sleeved on said shaft to abut said shoulder and having a transverse slot receiving said driving pin, the rear end of said driving clutch member being externally threaded, a retaining nut for said driving clutch member threaded on said shaft, a propeller provided with a conical bushing constituting a driven friction clutch member coacting with said driving clutch member with the driving clutch member projecting rearwardly from the driven clutch member, a coiled spring embracing the rearwardly projecting end of said driving clutch member and in thrust engagement with said driven clutch member, and a chambered support and adjusting member for said spring and constituting a housing therefor threaded on the rear end of said driving clutch member to adjustably support the spring in thrust engagement with said driven clutch member.

2. In a propeller the combination of a shaft threaded at its rear end, a conical rearwardly tapering driving clutch member externally threaded at its rear end and removably sleeved on said shaft for driving engagement therewith, a retaining nut for said driving clutch member threaded on said shaft, a propeller provided with a conical bushing constituting a driven friction clutch member coacting with said driving clutch member with the driving clutch member projecting rearwardly from the driven clutch member, a coiled spring embracing the rearwardly projecting end of said driving clutch member and in thrust engagement with said driven clutch member, and a chambered support and adjusting member for said spring and constituting a housing therefor threaded on the rear end of said driving clutch member to adjustably support the spring in thrust engagement with said driven clutch member, said retaining nut having means associated therewith projecting radially outwardly beyond the threaded end of said driving clutch member whereby said retaining nut limits rearward movement of said adjusting member on said driving clutch member.

3. The combination of a driving shaft threaded at its rear end and having a transverse driving pin, a conical rearwardly tapering clutch member sleeved on said shaft having a transverse slot receiving said driving pin, the rear end of said driving clutch member being externally threaded, a retaining nut for said driving clutch member threaded on said shaft, a driven member provided with a conical driven friction clutch element coacting with said driving clutch member with the driving clutch member projecting rearwardly therefrom, a coiled spring embracing the rearwardly projecting end of said driving clutch member and in thrust engagement with said driven member, and an adjusting member for said spring threaded on the rear end of said driving clutch member to adjustably support the spring in thrust engagement with said driven clutch member.

4. The combination with a propeller having a rearwardly tapering hub, said hub being provided with an internally conical driven clutch member, a driving shaft projecting through said hub and provided with a conical driving clutch member coacting with said driven clutch member in frictional supporting engagement therewith, the rear end of said driving clutch member projecting rearwardly from the hub, a coiled spring arranged on the rearwardly projecting end of said driving clutch member in thrust engagement with the propeller hub, and a combined housing and adjusting member for said spring threaded upon said driving clutch member and supportingly embracing said spring, the forward edge of said combined housing and adjusting member being closely spaced relative to the rear end of the hub, the adjusting member being externally conformed to complement the hub of the propeller.

5. The combination with a propeller having a hub, said hub being provided with an internally conical driven clutch member, a driving shaft projecting through said hub and provided with a conical driving clutch member coacting with said driven clutch member in frictional supporting engagement therewith, the rear end of said driving clutch member projecting rearwardly from the hub, a coiled spring arranged on the rearwardly projecting end of said driving clutch member in thrust engagement with the propeller hub, and an adjusting member for said spring threaded upon said driving clutch member and supportingly embracing said spring, the forward edge of said adjusting member being closely spaced relative to the rear end of the hub and a nut threaded on said shaft for retaining said driving clutch member thereon said nut having means associated therewith projecting radially outwardly beyond the threaded end of said driving clutch member to constitute an abutment to limit rearward movement of the adjusting member on said driving clutch member.

6. The combination of a driving shaft, a conical rearwardly tapering driving clutch member carried by said shaft and having a reduced portion at its rear end, a propeller provided with a conical driven friction clutch member coacting with said driving clutch member with the driving clutch member projecting rearwardly therefrom, a coiled spring embracing the rearwardly projecting end of said driving clutch member and in thrust engagement with the driven member, and an adjusting member for said spring mounted upon said reduced end portion of said driving clutch member to adjustably support the spring in thrust engagement with the driven clutch member, and a driving clutch member retaining means mounted on said shaft and projecting radially outwardly beyond the rear end of said driving clutch member to constitute a stop to limit rearward movement of said adjusting member on said driving clutch member being closely adjacent to the rear end of the driven member.

MERLE K. BENSON.

REFERENCES CITED

The following references are of record in the file of this patent:

UNITED STATES PATENTS

| Number | Name | Date |
|---|---|---|
| 788,810 | Ambler | May 2, 1905 |
| 886,601 | Hafelfinger | May 5, 1908 |
| 923,043 | Gulich | May 25, 1909 |
| 1,453,129 | Conlon | Apr. 24, 1923 |
| 1,818,946 | Freund | Aug. 11, 1931 |
| 1,895,402 | Sobey | Jan. 24, 1933 |